Nov. 22, 1966  J. H. ANDERSON, SR., ET AL  3,286,488

FLEXIBLE COUPLINGS AND HUB MOUNTINGS

Filed May 12, 1964  4 Sheets-Sheet 1

INVENTORS.
JAMES H. ANDERSON SR.
JAMES H. ANDERSON, JR.
BY

ATTORNEYS.

Nov. 22, 1966 J. H. ANDERSON, SR., ETAL 3,286,488
FLEXIBLE COUPLINGS AND HUB MOUNTINGS
Filed May 12, 1964 4 Sheets-Sheet 2

INVENTORS.
JAMES H. ANDERSON SR.
JAMES H. ANDERSON, JR.
BY
ATTORNEYS.

INVENTORS.
JAMES H. ANDERSON SR
JAMES H. ANDERSON, JR.
BY Kenyon, Palmer, Stewart & Estabrook

ATTORNEYS.

Nov. 22, 1966    J. H. ANDERSON, SR., ETAL    3,286,488
FLEXIBLE COUPLINGS AND HUB MOUNTINGS
Filed May 12, 1964    4 Sheets-Sheet 4

INVENTORS.
JAMES H. ANDERSON SR.
JAMES H. ANDERSON, JR.
BY
*ATTORNEYS*

United States Patent Office 3,286,488
Patented Nov. 22, 1966

3,286,488
FLEXIBLE COUPLINGS AND HUB MOUNTINGS
James H. Anderson, Sr., and James H. Anderson, Jr., both of 1615 Hillock Lane, York, Pa.
Filed May 12, 1964, Ser. No. 366,866
11 Claims. (Cl. 64—12)

This invention relates broadly to couplings and in particular, to a flexible coupling or connection between rotating shafts having high torque transmitting capabilities.

There are many flexible connections now in use which provide for a coupling between substantially aligned, rotating shafts while permitting a certain degree of both axial and angular displacement between the shafts. The prior art couplings generally achieve flexibility by utilizing the resiliency of thin portions of solid metal members, bearings, universal joints, gear teeth, or the like. In flexible couplings utilizing bearings or universal joint types of structure, the high cost of the various parts and the inevitable wear generated by constant rolling or sliding contact of the part entails the eventual replacement of costly components. A further disadvantage which is encountered when sliding parts are involved is the difficulty of maintaining concentricity between the shafts due to the clearance required between moving parts.

The present invention provides a flexible coupling which achieves the objectives, while eliminating the disadvantages of the prior art devices, through a structure that utilizes a network of elongated flexible members for the solid metal or bearing structures formerly used. The invention also provides a new and highly efficient shaft-to-coupling connecting means which provides quick and simple mounting and demounting of the coupling, while at the same time, provides a high torque strength joint at the point where the shaft connects to the coupling.

It is, therefore, an object of this invention to provide a new and improved coupling system which avoids the defects of the prior art devices.

It is a further object of this invention to provide a flexible coupling which is relatively inexpensive and simple to manufacture since the requirement for high cost and high tolerance machine parts is eliminated.

It is another object of this invention to provide an essentially wear-free and failure-safe flexible and shock absorbing coupling through the incorporation of flexible cables, deflectible struts, or the like to provide for the flexure element of the coupling.

It is yet another object of this invention to furnish a coupling for rotating shafts which may be quickly and simply assembled and yet which, at the same time, has an inherent high torque strength capability, through the provision of mating spiral threads on the transverse abutting surfaces of the coupling.

It is still a further object of this invention to provide a compact coupling system which, through the novel and judicious arrangement of the component parts thereof, is readily accessible for dismantling or assembling.

It is yet a further object of this invention to provide a coupling for shafts having transversely removable spacer elements for allowing dismantling and removal of the coupling without requiring axial displacement of either of the connected shafts.

These and other objects will be better understood by reference to the following detailed description when viewed in light of the accompanying drawings in which like reference numerals indicate like parts throughout the figures thereof and wherein.

Figure 2:
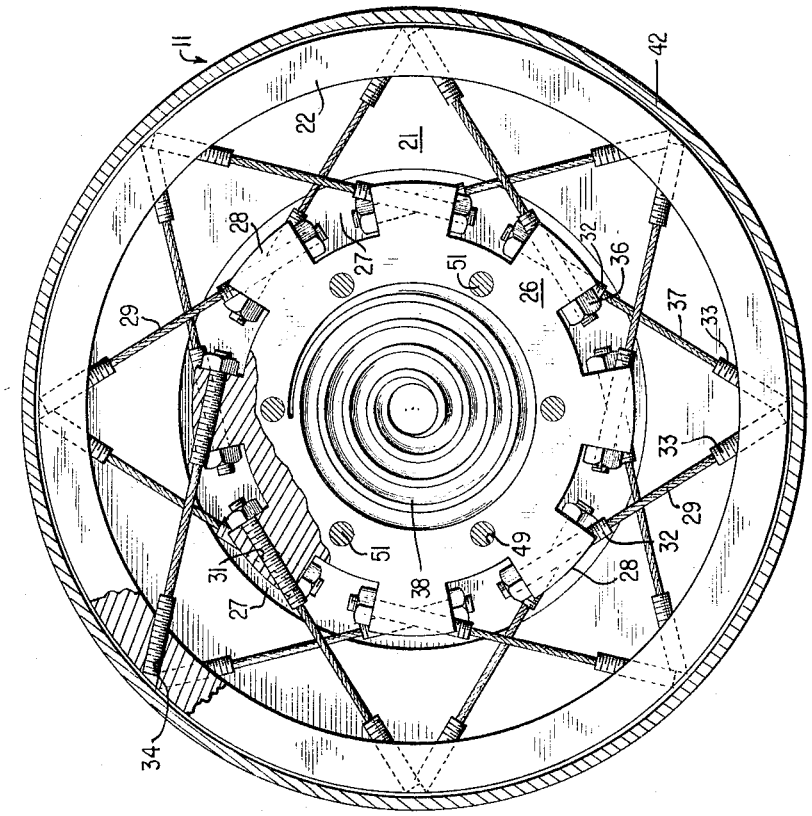
FIGURE 2 is a vertical sectional view of the coupling of FIGURE 1, the view being taken along the lines 2—2 of FIGURE 1.
Figure 1:
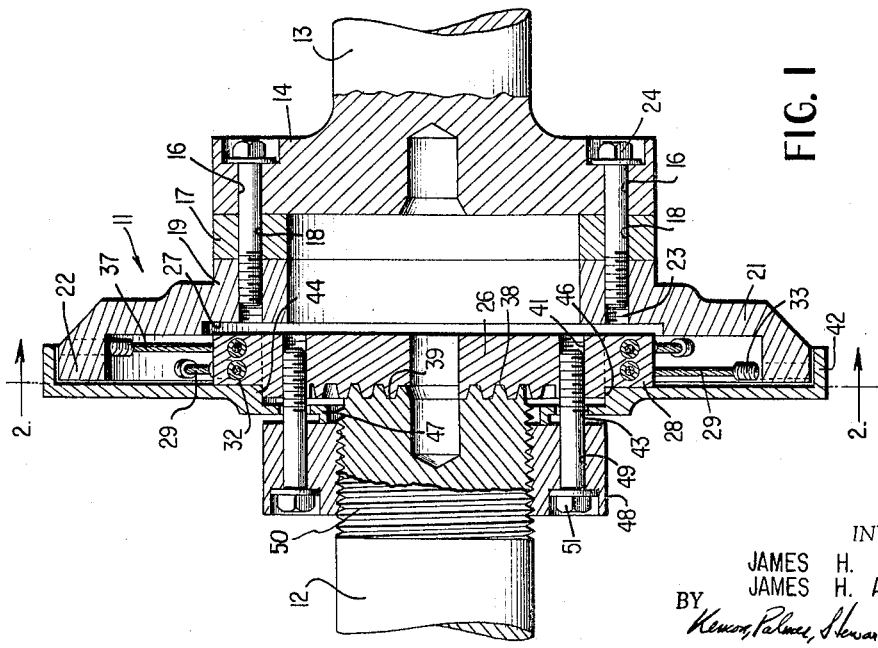
FIGURE 1 is an elevational view, partly in section, showing a pair of shafts coupled together and embodying the features of the present invention.

Referring particularly to FIGURES 1 and 2, there is shown a shaft 12 that is adapted to be coupled to a shaft 13 for transmission of torque therebetween. The shaft 13 is provided with a radially extending flange portion 14 which is formed with bolt receiving bores 16 disposed symmetrically around and proximate to the periphery thereof. An annular spacer 17 is positioned in abutting engagement with the end face of flange 14 and has a plurality of bores 18 therein corresponding to the bores 16.

The spacer 17 has a hub 19 mounted thereon by a plurality of bolts 24 that extend through the bores 16 and 18 and terminate in threaded bores 23 in said hub. The hub 19 is formed with a radially extending flange 21 that terminates in an annular axially extending member, rim or protrusion 22 and, as such, constitutes a part of the flexible portion of the coupling of the present invention. At this point, it should be observed that, in certain circumstances, the components as described could be readily fabricated as one integral part, however, the foregoing provides for a rapid and simple dismantling of the coupling which is a desirable feature in certain circumstances.

A second hub 26 is disposed within the rim or protrusion 22 of the first hub 21. The outer diameter of the hub 26 is less than the internal diameter of the rim 22 so that the hub 26 and the rim 22 are positioned in spaced concentric relation with one another and an annular space is defined between the members.

Referring more particularly to FIGURE 2, the hub 26 is formed with a plurality of radially extending projections 28 arranged in spaced relation to one another and with each projection having a pair of bores 31 extending therethrough. One bore in each projection is arranged tangentially with respect to the hub 26 in one direction of rotation while the other bore in each projection is arranged tangentially with respect to the hub in the opposite direction of rotation. A first set of cables 29, having threaded sleeves 32 affixed to an end thereof are connected to the first-mentioned bores 31 in the projections 28 by inserting the sleeves 32 through said bores so that the cables are disposed tangentially with respect to the hub 26. Threaded sleeves 33 are provided on the other ends of cables 29 and are threaded into tapped bores 34 disposed at a suitable angle around the rim 22 to connect the cables to the rim. The sleeves may be connected to the cables by swaging, crimping or any other desired means. Nuts 36 are threaded over the sleeves 32 and abut the projections 28 to connect the cables to hub 26 and to provide for suitable tension in the cables. A second set of cables 37 is disposed in tangential relationship to the hub 26 in the opposite rotational direction to the first set of cables 29. As shown, the cables 37 are disposed in a plane spaced axially from the cables 29. Cables 37 are provided with threaded sleeves 32 affixed to an end thereof which are connected to the second-mentioned bores in the projections 28 in a manner identical to that described for the cables 29. The opposite ends of cables 37 have threaded sleeves 33 for connection to the rim 22 in the same manner as that described for the cables 29.

In the embodiment of FIGURES 1 and 2, a circular counterbore 27 is provided in the face of flange 21 and it is of sufficient depth and diameter to prevent contact between the hubs 19 and 26 when axial or angular deflection occurs between the shafts. The hub 26 is formed with threaded bolt-receiving bores 41 that are symmetrically disposed around and proximate the periphery thereof. The shaft 12 has threaded thereon a collar 48 which is also provided with bolt-receiving bores 49 corresponding to the bores 41. An annular coupling cover 42 is disposed around the shaft 12 in abutting relationship with the hub 26 and has bolt-receiving bores 43 corresponding to the bores 41 and 49. The cover is further formed with a circular shoulder 44 that engages a matching shoulder 46 on the abutting face of hub 26 and an axially extending flange 47 around the inner periphery of the cover. Bolts 51 extend through the bores 49 and 43 and are threaded into the bores 41 of the collar to rigidly connect the hub 26 to the shaft 12 and the cover 42 to the assembly through the wedging action between the hub 26 and the collar 48 abutting against the cover and flange 47 respectively.

The cover 42 is not an essential part of the coupling but is preferably included to reduce windage and noise caused by the rotating connecting members and also, to prevent access to and possible damage of the cables or injury to operating personnel when the coupling is rotating. In the installation of the cover 42, it is axially located on the shaft 12 in such a position that the clamping action of the collar affords a spring action by imposing a slight elastic deflection of the cover flange 47.

The hub 26 has, concentrically, disposed on the transverse face thereof, abutting shaft 12, a radially expanding Archimedean spiral thread 38 while the transverse abutting face of shaft 12 has, similarly provided, a mating radially expanding Archimedean spiral thread 39.

The coupling is assembled by first threading collar 48 onto shaft 12, positioning cover 42 over the extending end of the shaft in abutting relationship with the collar and then placing the connected hubs 19 and 26 against the transverse face of shaft 12 so that the respective Archimedean threads 38 and 39 of the shaft and hub 26 are mating as shown. The bolts 51 are then inserted through the bores 49 and 43 of the collar and cover respectively, and threaded into the bores 41 of the second hub for axially connecting the members. The shaft 13 is then transversely aligned with the shaft 12 so that bores 16 and 23 of the flange 14 and the first hub 19 are suitably aligned. The shaft 13 is preferably designed to have a length over diameter ratio of a suitable value to give it sufficient flexibility to allow for a certain amount of transverse misalignment between it and shaft 12. The transverse component of this misalignment then can be provided for by suitable flexure of shaft 13. The spacer 17 is then inserted between the adjacent faces of the flange 14 and the first hub 19 and the bolts 24 are inserted through the bores 16 and 18 of the flange and spacer respectively and threaded into bores 23 of the hub to provide for axial and rotational connection of the hub assembly to the shaft 13.

The coupling is disassembled by first removing the bolts 24 from the assembly and slipping the spacer 17 transversely from the coupling. The bolts 51 are then removed allowing the hub 26 to first be moved axially towards shaft 13 to permit disengagement of the threads 38 and 39 and then, to be transversely withdrawn from between the shafts. Removal of the bolts 51 also frees the cover 42 which then may be removed. Finally, collar 48 is threaded off of the shaft 12 to complete the disassembly of the coupling.

The use of a mating Archimedean or equal pitch spiral thread between the hub 26 and the shaft 12 provides a means for efficient transmission of torque between two relatively small diameter members. The spiral thread also utilizes the force transmitted through the threads to provide a centering moment between the shaft 12 and the hub 26 to aid in maintaining them in coaxial alignment with one another. Although the threads 38 and 39 may be of any standard form, an Acme type thread configuration is shown in the embodiment of FIGURE 1 to illustrate a type of thread which may be used. The thread of this embodiment has a 14½-degree angle which produces less axial force for a given torque than would a conventional 30 degree thread. The bolts 51 serve primarily to hold the hub 26 against axial displacement from the shaft 12 and do not, in themselves, carry a large amount of shear force since this is essentially carried by the mating spiral threads. If the lead of the collar to shaft thread 50 is less than the movement of the hub rising of the threads 39 during one revolution of the hub 26 with respect to the shaft 12, torque is transmitted from the shaft 12 to the hub by the spline action of the spiral thread faces. As a result of incorporating this thread configuration, torque may be transmitted through the coupling in either rotational direction by the keying or splining action of the threaded faces. The rise of the spiral thread per revolution, or per unit angle of rotation of the hub 26 relative to the shaft 12, is a function of the pitch, lead and angle of the thread. Although single threads are shown in the embodiment illustrated, multiple threads could be obviously substituted without altering the basic concept of the invention.

The connection of the Archimedean threaded section at the periphery thereof provides a particular benefit in that a small amount of axial space is required to connect and disconnect the members. Connections disposed elsewhere, for example at the centerline thereof, would necessitate the provision of a great amount of centerline clearance, space impossible to provide in this device, to allow removal of that connection.

The embodiment shown in FIGURES 1 and 2, therefore, provides a flexible connection or coupling between two substantially aligned, rotating shafts which coupling may be effectively removed from between the shafts without requiring axial movement of either shaft. The flexibility of the coupling is derived from the connection of two relatively rigid members by the flexible connecting members which serve to retain the shafts 12 and 13 and the hubs 19 and 26 in a centered, coaxial disposition with respect to one another while, at the same time, providing for transmission of torque in either direction between the shafts. The flexible connecting members permit relative axial displacement between the shafts 12 and 13 and, also, relative angular displacement between the centerlines of the shafts. Furthermore, the cables afford a shock absorbing capability for the coupling by permitting some initial relative torsional movement between the shafts, which movement is a function of the elastic properties or spring rate of the cables in tension and can be adequately controlled by the proper selection of the cable configuration and material.

Obviously, the cables may be disposed in various patterns and relationships with respect to the transverse plane of the coupling. It is preferred, however, that the pattern illustrated in FIGURE 2, that is: sets of cables in each rotational direction disposed on an essentially tangential intersecting path with hub 26, be used, since the tensile stresses imposed on the cables in this configuration will be essentially parallel to the centerlines thereof. The pattern formed by the cables in the axial plane is primarily a matter of choice although a disposition of the cables in a plane perpendicular to the longitudinal axis of the coupling is preferred from a standpoint of material savings and machining facilities. As an alternative arrangement to the use of flexible shaft 13, it should be obvious that a shortened shaft could be placed between two couplings and thereby achieve the same results as a single coupling and a flexible shaft. Furthermore, in such a case, flange 22 could be replaced with a sleeve disposed around two adjacent hubs such as the hub 26 and a set of cables could be connected between the hub and the ends of the sleeve. Many other arrangements are also possible and could be suggested by reference to the various existing commercial varieties of flexible coupling designs.

If the installation of the equipment in which the coupling is used permits axial movement of the shafts, then the spacer 17 may obviously be omitted. The spacer is preferable in many types of equipment, such as the turbine-to-compressor coupling in turbo machinery, where such axial movement is not readily available and, the provision of a spacer allows dismantling and assembly of the coupling without necessitating axial displacement of either of the shafts. Obviously, in these cases, the axial thickness of the spacer 17 must be slightly in excess of the depth of the threads 38 and 39 so that the hubs may be displaced a sufficient axial distance to allow transverse removal thereof.

Figure 3:
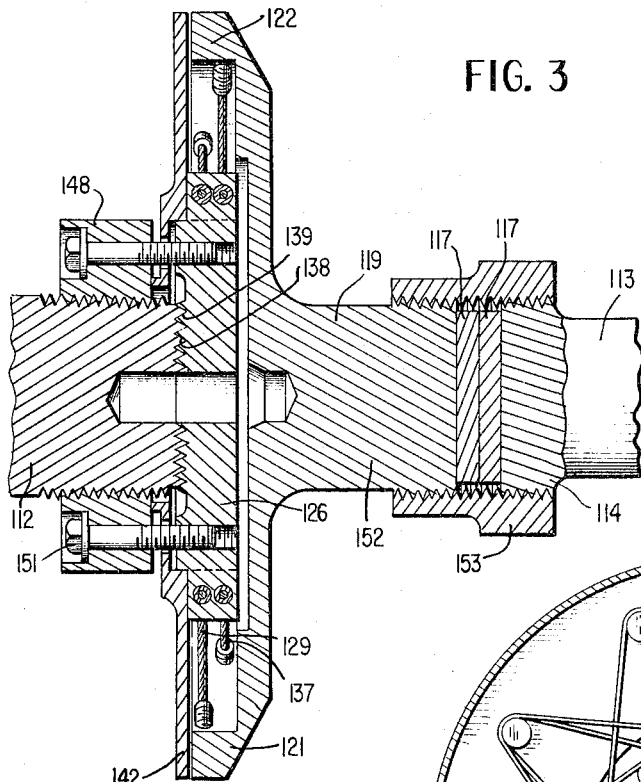
FIGURE 3 is an elevational view, partly in section, showing a pair of shafts coupled together and embodying features of the present invention.

In FIGURE 3 there is shown a variation of the coupling of FIGURES 1 and 2 and corresponding parts have been identified by the same reference number, but using the next higher series. The shaft 112 and hub 126 are provided with "V" type threads 138 and 139, respectively, which thread form comprises the radially expanding Archimedean spiral configuration as disclosed in FIGURE 1. The flange portion 114 on the end of shaft 113 is formed with external threads that are adapted to receive one end of an internally threaded elongated collar member 153. The other end of the collar 153 is threaded upon the end of stub shaft 152 of the hub 119 and a plurality of spacer members 117 carried by the collar 153 are interposed between the ends of shafts 113 and 152. The spacers 117 are greater in total axial length than the depths of the threads 138 and 139. This version of the coupling produces a particular benefit, in that, greater axial spacing is obtained between the adjacent ends of the shafts 112 and 113. This arrangement facilitates the removal of component parts of the coupling and furthermore, the shaft 113 is provided with a smaller flange portion 114 thereby allowing insertion of the shafts through or removal of the shaft from smaller diameter seals, bearings and the like.

Figure 4:
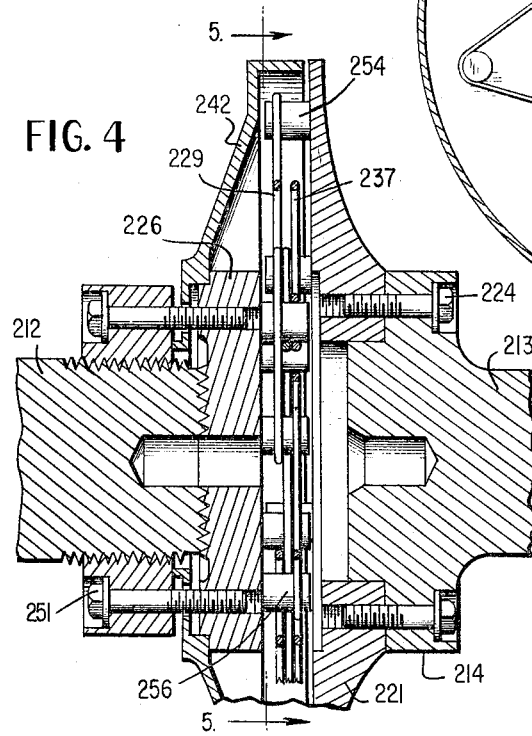
FIGURE 4 is an elevational view, partly in section and partly broken away, showing a pair of shafts coupled together and embodying the features of the present invention.
Figure 5:
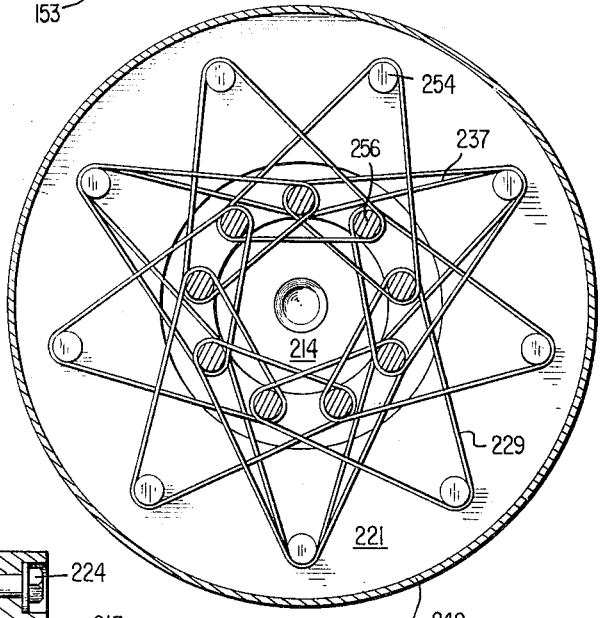
FIGURE 5 is a sectional view of the coupling of FIGURE 4 on a reduced scale, the view being taken along the line 5—5 thereof.

Referring to FIGURES 4 and 5 of the drawings, where corresponding parts have been identified using the same number but of the next higher series, the use of continuous cables 229 and 237 has been incorporated in lieu of the individual cables 29 and 37 of FIGURES 1 and 2. The first hub 221 is provided with axially protruding studs 254 proximate the periphery thereof while the second hub 226 has mounted thereon a corresponding number of protruding studs 256 extending axially in the opposite direction from the studs 254. The studs are arranged to define coaxially disposed circular patterns and the relative diameter of the circles circumscribed thereby is such that an annular space is defined therebetween. This provides a space similar to the annular space defined between the flange 22 and the hub 26 of FIGURES 1 and 2.

Referring specifically to FIGURE 5, it will be seen that the cable 229 is wound first around one of the outer studs 254, then, proceeding in a clockwise direction, around the proper inner stud 256 to give the cable an essentially tangential intersection with the circle defined by the inner studs, and then, returning in a counterclockwise direction, around a stud 256 two studs removed from the first-mentioned inner stud 256. The cable is then returned to the outer stud next adjacent to the first-mentioned outer stud 254 in a clockwise direction and so forth. As will be seen, the star-like pattern formed by the progressive winding of the cable 229 provides essentially the same configuration as that of FIGURE 2. The cable 237 may be also wound in an identical pattern to that described for the cable 229. Cable 237 may obviously be wound in other configurations such as the three-pointed star shown in FIGURE 5 which is formed by winding the cable between the inner face of every third stud 256 and around the outer face of every third stud 254 as shown. Cable 239 also could be wound in this or other configurations as desired.

Figure 6:
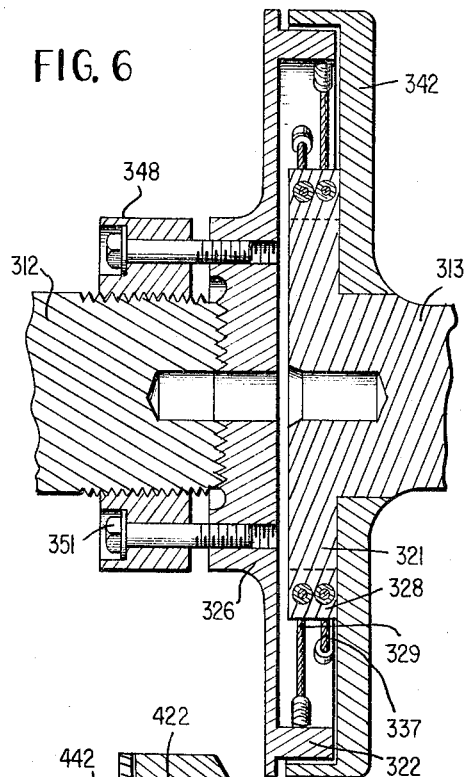
FIGURE 6 is a vertical sectional view of yet another coupling in accordance with the invention.

There is shown in FIGURE 6 a still further modification embodying the basic concept of the invention wherein the hubs are reversed so that the first hub 321 is provided with the projections 328 while the second hub 326 is provided with the axially extending flange 322. This flange is of such a diameter as to provide, between it and hub 321, an annular space while the cover 342 is mounted on the hub 321 and serves the same purposes as the covers described for the previous figures.

Figure 7:
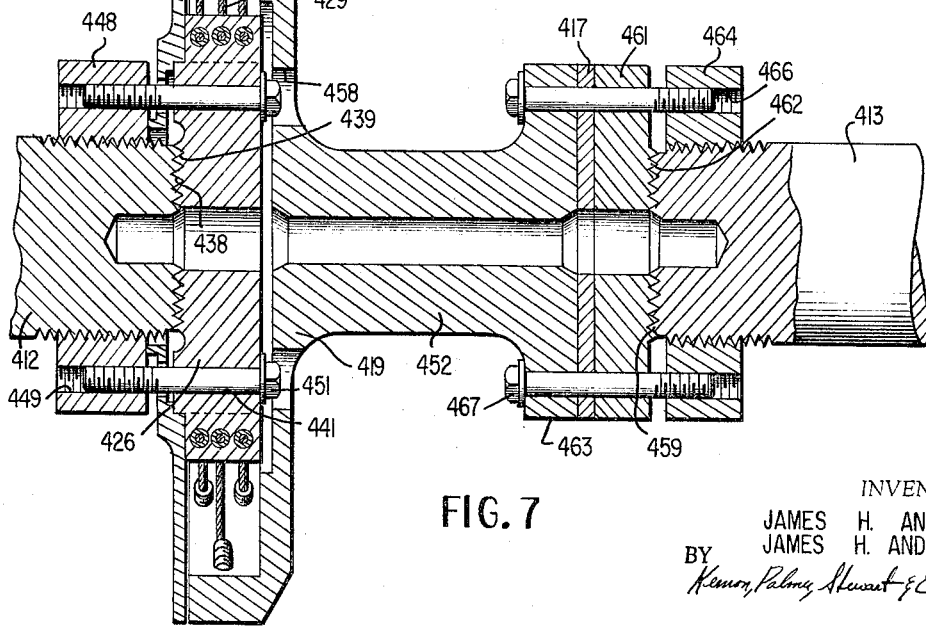
FIGURE 7 is a vertical sectional view of still another coupling in accordance with the invention.

With reference to FIGURE 7, still another structural variation of the basic concept of the invention is illustrated wherein a third row of cables is employed in addition to the two rows of cables shown in FIGURES 1 and 2. In this embodiment, a row of cables 457 is added to the rows of cables 437 and 429 to connect the flange 422 to the second hub 426 of the coupling. The row of cables 457 is preferably disposed at the same angle as the row of cables 437 to provide additional torque transmitting capability for the coupling in that rotational direction. This is useful since, in many cases, torque is usually imposed on a coupling in one direction only. The double row of cables should, therefore, be disposed in a direction to carry the torque in the rotational direction intended for the particular installation. Obviously, by proper exercise of design, as many rows of cables as necessary could be incorporated in the hub structure depending upon the intended operational use and strength requirements of the hub.

It is to be noted that, in FIGURE 7, the arrangement of holes and threaded bores in the various parts for connecting the components of the coupling has been reversed over the disclosure of the previous figures. This is merely to illustrate the adaptability of making minor changes or revisions depending upon the particular uses of the coupling in question.

The transverse face of the shaft 413 is provided with a radially expanding Archimedean spiral thread 459 which may be identical to the thread 439 of the shaft 412 or may be similar to the Acme thread 39 of the coupling of FIGURE 1. Abutting the shaft 413 is an intermediate hub 461 which has a mating Archimedean spiral thread 462 on the transverse face thereof in abutting relationship with the shaft 413. The spacer 417 is disposed between the flange 463 and the intermediate hub 461. This spacer serves the same purpose as the spacer described for the preceding figures and must also be greater in axial length than the depth of threads 459 or 462. An annular collar 464 is threaded over the end of shaft 413 in a manner similar to the collar 448 on the shaft 412. The collar 464 has a series of threaded bores 466 therethrough and around the periphery thereof while corresponding bores are disposed through the flange 463, the spacer 417 and the intermediate hub 461 to provide a passage for bolts 467. The bolts 467 are threaded into the bores 466 or the collar 464 to connect the shaft 413 to the coupling. The use of the Archimedean spiral connection at both ends of the coupling affords the benefits realized from the utilization of the Archimedean spiral-type of connection in the embodiment of FIGURE 1. In this case, these benefits are realized in both of the shaft connecting points in the coupling.

Figure 8:
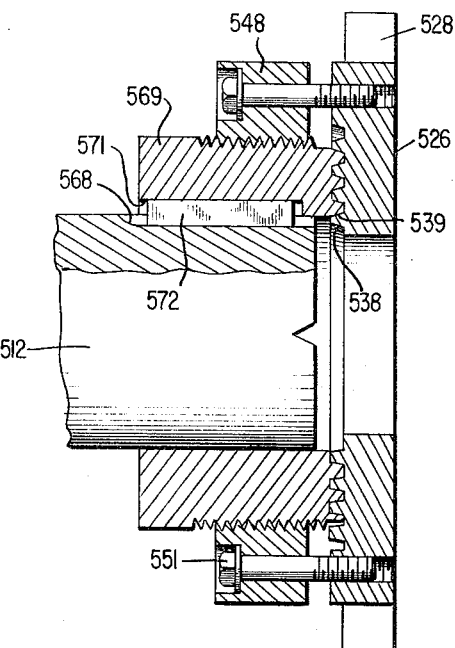
FIGURE 8 is a vertical sectional view of a portion of a coupling embodying the features of the invention, partly in section, and enlarged to show the details of an embodiment of the coupling-shaft connection in accordance with the invention.

Another variation, utilizing the Archimedean spiral thread connection is shown in FIGURE 8 of the drawings. In this embodiment, the shaft 512 is formed with a keyway 568 and an annular hub 569, having an internal keyway 571, is secured to said shaft by a key 572. The transverse face of the hub 569, adjacent to the coupling, is provided with radially expanding Archimedean spiral threads 539 which mate with the Archimedean spiral threads 538 of the hub 526 as shown. The annular collar 548 is threaded over the hub 569 and the bolts 551 connect the collar and hub 526 as described in the aforegoing figures.

This modification provides a coupling having the Archimedean spiral connections, and the coupling is adapted to be installed on any shaft having a standard keyway since the Archimedean thread feature is on a separately provided hub portion. The hub 569 could also be provided with splines on the interior surface thereof to mate with standard spline shafts if so desired.

Figure 9:
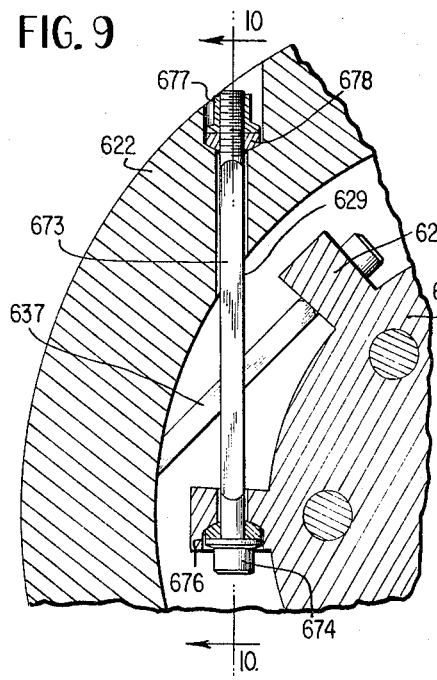
FIGURE 9 is a vertical enlarged sectional view, partly broken away, showing the details of a variation of the connecting members and attaching means therefore in accordance with the invention.
Figure 10:
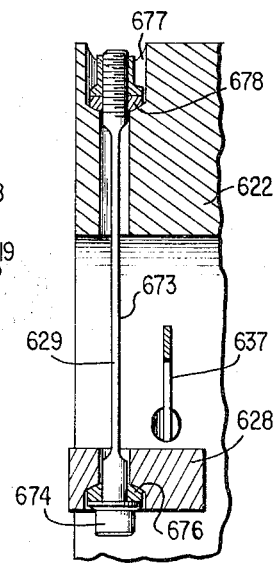
FIGURE 10 is a sectional view taken along the lines 10—10 of FIGURE 9.

FIGURES 9 through 15 illustrate various modifications of the flexible connecting members of the coupling in accordance with the teachings of the invention. In FIGURES 9 and 10, the rim 622 is connected with the projection 628 on the first hub 619 by a first strut 629 and a second strut 637 which consist, in this embodiment of a solid elongated spring metal member having a flattened portion 673 thereon which extends from a point proximate one end thereof to a point proximate the opposite end thereof. At the end of the strut which connects to the projection 628, a headed portion 674 is formed and abuts a washer 676 which, in turn, has a spherical portion on the underface. The washer engages a mating spherical recess in the projection 628 as shown. A threaded portion is provided on the end of the strut which connects to the rim portion 622 and a nut 677 is threaded over this portion to abut a washer 678. The washer 678 has a spherical underportion which is in abutting relationship with a spherical recess in the rim 622.

The configuration shown in FIGURES 9 and 10 is particularly suitable for use in applications where the coupling is to be subjected to high rotation speeds and provides advantages over the cable type connection shown in the preceding figures in that, due to the structural shape and disposition of the connecting members, the connecting members are rigid in a plane perpendicular to the rotational axis of the coupling and resist deflection in that plane under centrifugal force while they retain flexibility in planes parallel to the axis of rotation to provide the benefits afforded by the previous embodiments. The spherical surfaces of the washers shown in the embodiments of FIGURES 9 and 10 allow deflection of the struts without causing undue localized bending forces at the connecting points.

Figure 11:
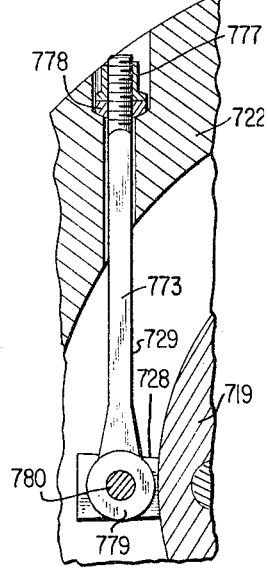
FIGURE 11 is a view similar to FIGURE 9 showing a further variation in the means for attaching the connecting members of FIGURE 9 in accordance with the invention.

In FIGURE 11, a further variation of the embodiment of FIGURES 9 and 10 is shown. This embodiment consists of a rigid solid strut 729 having a flat portion 773 thereto connecting the rim 722 to the first hub 719. The connecting means for the strut to the rim, in this embodiment, is essentially the same as that shown in FIGURES 9 and 10 but the connection means to the projection 728 differs in that the strut 729 is formed with a ring 779 on the inner end thereof which is fitted over a pin 780 mounted on the projection 728 and extending parallel to the rotational axis of the coupling. This arrangement provides the benefits of the structure of FIGURES 9 and 10 while furnishing the additional benefit of rotationally fixing the strut 729 with respect to its longitudinal axis to prevent the strut from rotating so that its more rigid cross section is presented to a plane parallel to the rotational axis of the coupling.

Figure 12:
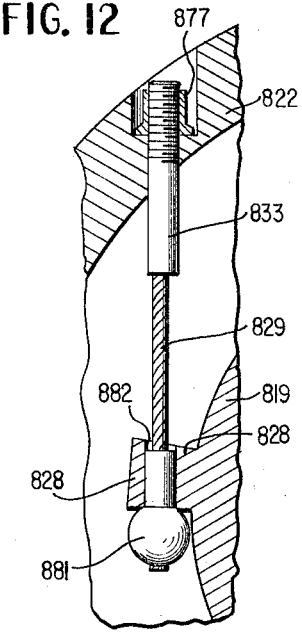
FIGURE 12 is a view similar to FIGURE 9 showing a further variation in the means for attaching the connecting members of FIGURES 1 through 7 in accordance with the invention.

Referring now to FIGURE 12 of the drawings, a further variation in the structure of the coupling of the cable connecting members is shown and consists of a threaded sleeve 833 swaged or otherwise fixed over one end of the cable 829 and fixed to the rim portion 822 by a nut 877 threaded thereover and a sleeve and spherical knob 881 swaged over the other end of the cable 829 and disposed through a port 882 in the projection 828.

Figure 13:
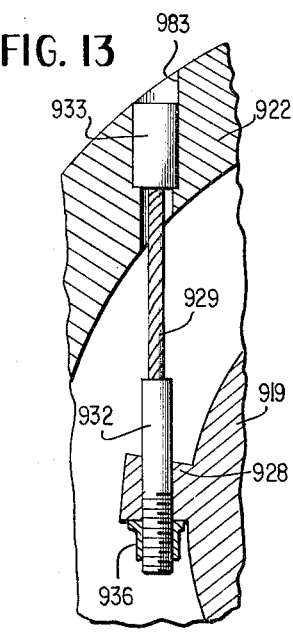
FIGURE 13 is a view similar to FIGURE 12 showing still another variation in the means for attaching the connecting members thereof.

In FIGURE 13, there is shown a threaded sleeve 932 on one end of the cable and disposed through the projection 928 and connected thereto by a nut 936 threaded thereover and a cylindrical knob 933 swaged or otherwise connected to the other end of the cable 929 and disposed in bore 983 in the rim member 922.

Figure 14:
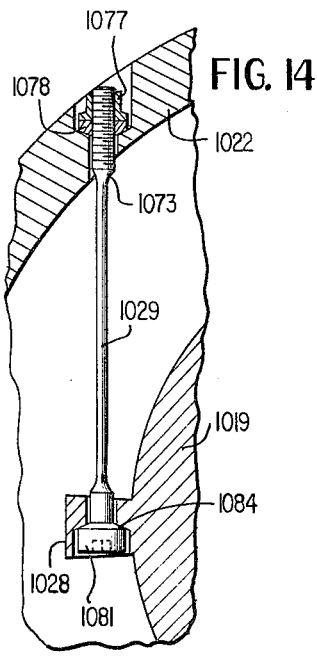
FIGURE 14 is a view similar to FIGURE 12 illustrating yet a further variation in the attaching means for the connecting members thereof.

In FIGURE 14, there is disclosed a solid flexible strut 1029 having a necked down reduced portion 1073 thereto and connected to the rim 1022 by a nut 1077 threaded over a threaded portion of the strut and abutting a washer 1078 having a spherical surface as in the embodiments of FIGURES 9, 10 and 11. At the other end of the strut, a cylindrical knob is provided with a tapered lateral face 1084 which engages a mating tapered face in a recess in the projection 1028.

Figure 15:
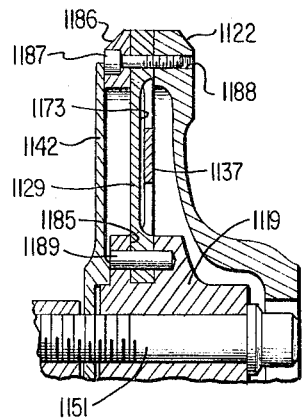
FIGURE 15 is an elevational view, in section and partly broken away of a further variation in the attaching means and the connecting members of the invention.

A further variation in the embodiments shown in FIGURES 9 through 11 is illustrated in FIGURE 15 wherein a pair of struts 1129 and 1137 are disposed between a rim 1122 and a first hub 1119. The major change in the configurational structure of the struts lies in the fact that the struts are formed with the flat portions thereof less than one-half of the total axial thickness of the struts and disposed on alternate sides of the centerlines thereof. The crossing strut members may be disposed in a mating fashion, as shown, providing for alignment of the respective ends of the struts in a coplanar fashion in a plane transverse of the coupling, thereby, allowing the recesses required for the ends of the struts to be formed as a circumferential slot or face around the respective members of the coupling. The inner ends of the struts are disposed in a circumferential slot 1185 formed around the hub 1119 while the outer ends of the struts are positioned against and connected to the transverse base of rim 1122 by an annular member 1186 and a plurality of bolts 1187 which project through said annular member and strut ends and are threaded into a bore 1188 in said rim. The inner ends of the struts are secured to the hub 1119 by pins 1189 that are mounted in bores suitably disposed around the periphery of said hub. The struts could be connected to the hubs by brazing, welding, rivetitng, swaging or any other suitable means.

It also should be pointed out that, in each of the strut embodiments where the coupling need transmit torque in one direction only, all of the struts may be oriented in a single rotational direction and need not cross each other since there will be sufficient inherent resistance to flexure in the struts to mechanically support the hubs in their spaced relationship.

It should be understood that the various modifications of the basic concept of the invention described hereinabove are merely intended to be examples of the many ways in which the invention can be incorporated into couplings particularly suited for different operational requirements. Furthermore, the features of any particular coupling described herein can be readily interchanged with the features of other couplings and still come within the basic concept of the present invention. It should, therefore, be understood that, within the scope of the appended claims, the invention may be practiced otherwise than as specifically described. What is claimed as new and desired to be protected by Letters Patent of the United States is:

We claim:

1. A flexible coupling for connecting two substantially aligned shafts comprising a first and a second hub, means to fix each hub to an end of a corresponding shaft so that said hubs are disposed in adjacent opposing relation to one another, a radially extending flange terminating in an axially extending marginal rim on said first hub, said second hub disposed co-axially within said rim and defining with said rim an annular space therebetween, a first plurality of relatively rigid elongated torque transmitting members extending in a radial plane between said rim and said second hub, a second plurality of relatively rigid elongated torque transmitting members extending in a radial plane between said rim and said second hub, said rim having a common means for receiving an end of each of said first and second plurality of rigid members, said second hub having a common means for receiving an end of each of said first and second plurality of rigid members, said members of each of the first and second pluralities of relatively rigid members having portions thereof configured so as to be arranged in spaced relation to one another, said members of said first and second pluralities having a greater moment of inertia in the transverse direction than in the axial direction with respect to said hub whereby said members have a greater resistance to flexure in said transverse direction than in said axial direction while providing for transmission of torque between said shafts.

2. A coupling in accordance with claim 1 wherein the means to fix one of said hubs to the end of the corresponding shaft comprises an expanding Archimedean spiral thread provided on said hub and on the end of said shaft and means disposed around the periphery of that shaft to axially fix the hub and shaft with respect to one another with the threads on said hub mating with the threads provided on the end of said shaft to provide for omni-directional transmission of torque therebetween.

3. A coupling in accordance with claim 2 wherein the means to fix the other of said hubs to the end of the corresponding shaft includes at least one radially removable spacer disposed between the hub and shaft, the axial thickness of said spacer being in excess of the depth of said spiral threads to provide for removal of said coupling without necessitating axial displacement of said shafts.

4. A coupling for connecting two shafts which are substantially aligned comprising:

a flexible connection comprising:
(a) a first hub mounted on one of said shafts in coaxial relationship therewith including a radially extending flange terminating in an axially extending marginal rim;
(b) a second hub having a surface mounted in abutting engagement and in coaxial relationship with the end of the other of said shafts, said second hub being concentrically disposed within the rim of said first hub, the respective diameters of said rim and said second hub being such that an annular space is defined therebetween;
(c) a first plurality of flexible members mounted tangentially on said second hub and extending in one rotational direction to the rim of said first hub to provide a uni-directional torque transmitting connection therebetween;
(d) a second plurality of flexible members mounted tangentially on said second hub and spaced axially from said first plurality of flexible members and extending in the opposite rotational direction therefrom to provide, in combination with said first flexible members, omnidirectional torque transmitting connection therebetween;

means to releasably connect said hubs to said shafts comprising:
(a) radially expanding and mating Archimedean spiral threads on the abutting surfaces of said second hub and said other shaft, and means disposed around the periphery of said other shaft to axially fix said hub thereto;
(b) an axially threadable connection between said first hub at said one shaft, said connection including at least one transversely removable spacer between the abutting transverse surfaces of the hub and shaft, said spacer being, in axial thickness, in excess of the depth of said spiral threads to provide removal of said coupling without requiring axial displacement of said shafts.

5. In a coupling for connecting rotative members which are substantially aligned, radially expanding and mating Archimedean spiral threads disposed on the abutting faces of said members, the respective lead of the threads being such that the coupling has an omni-directional torque transmitting capability through the spline and friction action of the threads, means disposed around the periphery of said members and having aligned apertures therein with bolts extending therethrough to axially fix said members with respect to one another.

6. A flexible coupling connecting two shafts which are substantially aligned, comprising a first hub having an axially extending rim around the periphery thereof, a second hub positioned within the confines of said rim to define an annular space therebetween, said second hub having a circumferentially extending slot formed in the periphery thereof, a first plurality of relatively rigid elongated members extending in a radial plane in said annular space with an end of each of said members secured in said slot, a second plurality of relatively rigid elongated members extending in a radial plane in said annular space with an end of each of said members secured in said slot, an annular member secured to said rim in spaced parallel relation therewith, the other end of each of said first and second pluralities of relatively rigid members being interposed between said rim and annular member to transmit torque between said hubs, said first and second plurality of relatively rigid members being arranged so that adjacent members cross one another with the areas of said members crossing one another being formed with flat portions so as to maintain said areas in spaced relation to one another, and means to connect said hubs to the shafts to be coupled.

7. A coupling to connect two shafts which are substantially aligned comprising a flexible connection comprising a first hub co-axially mounted on one of said shafts and comprising a radially extending flange having means extending axially around and proximate the periphery thereof, a second hub having a surface mounted in abutting engagement and in co-axial relationship with the end of the other of said shafts, said second hub being concentrically disposed within the means of said first hub, the respective diameters of said means and said second hub being such that an annular space is defined therebetween, a first and second set of elongated relatively rigid members connecting the means of said first hub to the outer periphery of said second hub to provide for transmission of torque between said shafts, said members being relatively rigid and stiff in a radial direction with respect to said hubs and relatively flexible in an axial direction of said shafts, said second hub having a circumferentially extending slot formed in the periphery thereof, said first and second set of rigid members each having an end secured in said slot with the other end of each of said first and second set of rigid members being secured to the means of said first hub, and means for connecting said first and second hubs to said shafts.

8. A coupling in accordance with claim 7 wherein said means for connecting said second hub at least to said shaft comprises radially expanding and mating threads having an Archimedean spiral thereto on the abutting surfaces of the hub and shaft, and means disposed around the periphery of said shaft to axially fix that hub to the shaft.

9. A coupling in accordance with claim 8 wherein said means to fix the hub to the shaft comprises a collar fixed to said shaft proximate the coupled end thereof, said collar and the hub having corresponding sets of bolt receiving bores therein, and bolts disposed through said bores to axially fix tthe hub and the shaft with respect to one another, at least one of said sets of bores being adapted to threadedly engage said bolts to provide a connection point therefore.

10. A coupling for connecting two rotatable abutting members comprising a radially expanding Archimedean spiral thread on the abutting surface of one of said members, a mating radially expanding Archimedean spiral thread on the abutting surface of the other of said members, said threads being in torque transmitting engagement with one another, means disposed around the periphtry of said members to releasably maintain them in abutting relationship to one another with the means on one of said members being adjustable with respect to the other means.

11. A coupling in accordance with claim 10 wherein said members are substantially aligned shafts and said means to maintain said members in abutting relationship comprises a flange around one of said members and a collar threadably engaging the periphery of the other of said members, said flange and collar having axially disposed circumferentially aligned bores therethrough, and bolts extending through said bores, said bolts being threadedly engaged by nuts to connect said flange and said collar together.

References Cited by the Examiner

UNITED STATES PATENTS

| 732,079 | 6/1903 | Hunt | 64—12 |
|---|---|---|---|
| 1,065,736 | 6/1913 | Simmons | 64—12 |
| 1,114,326 | 10/1914 | Allen | 64—12 |
| 1,654,312 | 12/1927 | Trumpler | 64—12 X |
| 1,681,793 | 8/1928 | Steiner | 64—12 |
| 2,206,223 | 7/1940 | Dearborn | 287—130 |
| 2,303,031 | 11/1942 | Dusevoir | 287—130 X |
| 2,809,506 | 10/1957 | McDaniel | 64—6 X |
| 2,859,600 | 11/1958 | Wrightson et al. | 64—15 |
| 3,041,857 | 7/1962 | Anderson et al. | 64—13 X |

FOREIGN PATENTS

| 949,299 | 2/1964 | Great Britain. |
|---|---|---|

FRED C. MATTERN, JR., *Primary Examiner.*

MILTON KAUFMAN, *Examiner.*

HALL C. COE, *Assistant Examiner.*